Patented Aug. 16, 1949

2,478,914

UNITED STATES PATENT OFFICE 2,478,914

PRODUCTION OF BENZOTHIOPHENES

Bernard S. Greensfelder, Oakland, and Robert J. Moore, Berkeley, Calif., assignors to Shell Development Company, San Francisco, Calif., a corporation of Delaware No Drawing. Application March 23, 1948, Serial No. 16,628

14 Claims. (Cl. 260—329)

This invention relates to the production of thiophene compounds of condensed ring structure and relates more particularly to the production of benzothiophene and alkyl substituted benzothiophenes.

The aromatic sulfur compounds consisting of the class of benzothiophene and alkyl substituted benzothiophenes are of prime importance because of the widening field of their application. They are of particular value as starting and intermediate materials in the production of many chemicals and pharmaceuticals. Their utilization often has been handicapped heretofore, however, by the lack of suitable methods enabling their efficient large scale production.

In accordance with the present invention, aromatic sulfur compounds of the class consisting of benzothiophene and alkyl substituted benzothiophenes are obtained by reacting a styrene hydrocarbon wherein the styrene nucleus contains a hydrogen atom in the ortho position with respect to the unsaturated side chain, with hydrogen sulfide, or a hydrogen sulfide-containing gas, in the presence of a dehydrogenation catalyst at a temperature in the range of from about 400° C. to about 750° C.

By the term "styrene hydrocarbon" as used throughout the present specification and the attached claims is meant the ethenylbenzene hydrocarbons represented by the formula:

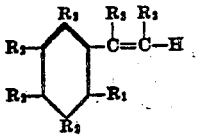

wherein both $R_1$ and $R_2$ each represent hydrogen or the same or differing alkyl groups. Hydrocarbons suitable for use as charge to the process of the invention are the styrene hydrocarbons having a hydrogen atom in the ortho position with respect to the olefinic side chain. Such suitable styrene hydrocarbons are represented by the above graphical formula when $R_1$ is hydrogen and $R_2$ is hydrogen or an alkyl group. The styrene hydrocarbons which are employed in the obtaining of the benzothiophenes in accordance with the invention, therefore, comprise the hydrocarbons consisting of a benzene or alkyl substituted benzene ring of which a nuclear carbon atom is directly connected to an unsaturated carbon atom of an olefinic side chain and having a hydrogen atom attached to the nuclear carbon atom which is adjacent to the nuclear carbon atom connected to the olefinic side chain. Examples of the substituent alkyl groups, represented by the $R_2$ in the above formula, are methyl, ethyl, propyl, isopropyl, n-butyl, sec-butyl, tert-butyl, isobutyl, pentyl, isopentyl and their homologues. Examples of the suitable styrene hydrocarbon starting materials are: ethenylbenzene (styrene), 2-phenyl-1-propene (alpha-methylstyrene), 1-methyl-2-ethenylbenzene, 1-methyl-3-ethenylbenzene, 1-methyl-4-ethenylbenzene, 1,2-diethenylbenzene, 1,3-diethenylbenzene, 1,4-diethenylbenzene, 1-ethyl-2-ethenylbenzene, 1-ethyl-3-ethenylbenzene, 1-ethyl-4-ethenylbenzene, 1-ethenyl-2,4-dimethylbenzene, 1-ethenyl-3,5-dimethylbenzene, 1-methyl-2-isopropenylbenzene, 1-methyl-3-isopropenylbenzene, 1-methyl-4-isopropenylbenzene, 1,3-dimethyl-4-propenylbenzene, 1-phenylbutene-1, 2-phenylbutene-1, 2-phenylbutene-2, 1-phenylpentene-1, 2-phenylpentene-1, 2-phenyl-3-methylbutene-1, 1,4-diethyl-2-ethenylbenzene. Of the suitable styrene hydrocarbons, styrene and the styrene hydrocarbons with alkyl substitution in the nucleus are particularly preferred.

The hydrocarbon charge to the process of the invention need not necessarily consist of only one of the above-defined styrene hydrocarbons but may contain more than one of such hydrocarbons. The styrene hydrocarbon charge may furthermore include other hydrocarbons capable or not of undergoing conversion under the conditions of execution of the reaction. If desired, gaseous materials, inert under conditions of execution of the invention, capable of functioning as diluents or heat carrying media, may also be added to the charge or introduced as a separate stream into the reaction zone.

The hydrogen sulfide to be reacted with the styrene hydrocarbon charge is introduced into the system in admixture with the styrene hydrocarbons or it may be introduced in part, or in its entirety, in a separate stream to the inlet or any intermediate part of the reaction zone. The ratio of hydrogen sulfide to styrene hydrocarbon charge may vary considerably within the scope of the invention. It has been found, however, that maintenance of a molar excess of hydrogen sulfide over styrene hydrocarbons charged is essential to efficient operation of the process. The ratio of hydrogen sulfide to styrene hydrocarbons charged is preferably maintained in the range of from about 2:1 to about 8:1 and still more preferably in the range of from about 4:1 to about 6:1. Higher ratios of hydrogen sulfide to styrene hydrocarbon may, however, be used. It has been found that the use of hydrogen sulfide in a molar ratio to styrene hydrocarbon in excess of at least 3:1 obviates the presence to any substantial degree of undesirable side reactions, particularly polymerization reactions. When utilizing a ratio of hydrogen sulfide to styrene hydrocarbon substantially below 2:1, the amount of styrene hydrocarbons lost as a result of side reactions, particularly polymerization, is often sufficiently great to mitigate seriously against the practical operation of the process. The presence of the hydrogen sulfide in substantial molecular excess furthermore enables the attainment of substantially increased conversions and contributes materially to prolongation of catalyst life.

Production of the benzothiophenes of the invention necessitates the presence of a dehydrogenation catalyst. Particularly suitable catalysts comprise the dehydrocyclization catalysts, that is, catalysts promoting not only the dehydrogenation reaction but the cyclizing reaction as well. Catalysts which may be employed in the process of the invention comprise the oxides, sulfides and other compounds of the metals of the first transition series of the periodic table which includes titanium, vanadium, chromium, manganese, iron, cobalt and nickel. These catalysts are preferably employed in combination with a major proportion of a highly adsorptive material thermally stable at the process temperature. While these metals, or compounds thereof, may be used alone or in admixture with each other, it has been found highly advantageous to add a promoting substance capable of increasing the activity of the catalyst in its ability to catalyze the reactions of the invention. Suitable promoting materials are the highly porous and at the same time thermally stable materials consisting of at least one of the oxides of the elements aluminum, silicon and magnesium. Preferred catalysts consist of a larger part of the highly porous adsorbent material supporting a minor proportion of the dehydrogenation metal or compound thereof. The catalysts may be prepared in any suitable manner resulting in the deposition of the metal, or compound thereof, in a highly dispersed condition on the surface and in the pores of the adsorptive material. Of the adsorptive supports possessing ability to promote the catalytic activity of the dehydrogenation metals or compounds thereof, adsorptive alumina and activated bauxite are somewhat preferred. A particularly preferred catalyst consists of adsorptive alumina such as an activated alumina, supporting a minor proportion, for example, from about 3% to about 10% by weight of iron, or a compound thereof in highly dispersed form. Particularly advantageous catalysts of this type are the iron-containing adsorptive aluminas such as, for example, the iron-containing adsorptive alumina known in the industry as Grade B activated alumina.

It is to be stressed that the higher activity of the catalysts consisting of a predominant amount of the adsorptive material and a minor amount of the dehydrogenation metal, or compound thereof, is in no wise the result of an additive effect since the adsorptive materials, even those having the greatest effect upon the dehydrogenation metal or compounds thereof, such as the adsorptive aluminas, themselves possess no ability to promote the heterocyclic ring-forming reaction.

The catalysts employed in the process of the invention are preferably subjected to an elevated temperature in the range of, for example, from about 300° C. to about 700° C. in an atmosphere of hydrogen sulfide, prior to their use in catalyzing the reactions of the invention. Subjection of the catalyst to an elevated temperature, for example, in the range of from about 300° C. to about 700° C., in an atmosphere, comprising hydrogen and hydrogen sulfide in the molar ratio of 3:1 to 1:3 has been found to have an advantageous effect upon the activity of the catalyst.

The reaction is executed at a temperature in the range of from about 400° C. to about 750° C., and preferably in the range of from about 575° to about 650° C. Atmospheric, subatmospheric or superatmospheric pressures may be employed within the scope of the invention. It is, however, preferred to use pressures in the range of from about atmospheric pressure to about 500 lbs., and more particularly from about atmospheric to about 300 lbs. A contact time of from about 2 to about 60 seconds, and preferably from about 15 to about 35 seconds is found suitable. Longer periods of contact may be employed, however, within the scope of the invention.

Under the above-defined conditions the styrene hydrocarbon will react with the hydrogen sulfide to form the corresponding benzothiophene. Thus under the above-defined conditions conversions of over 60% per pass with a yield of benzothiophenes of 90% based upon the styrene hydrocarbon consumed are readily obtained.

The particular benzothiophene obtained will of course be dependent upon the nature of the particular styrene hydrocarbon of the above-defined suitable class charged. The overall reaction representing the formation of a benzothiophene from a styrene hydrocarbon of the suitable class above-defined in accordance with the invention may be illustrated as follows:

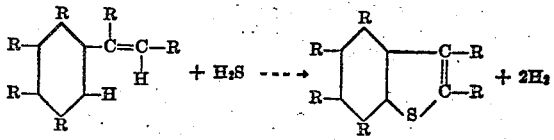

wherein R represents hydrogen or an alkyl group. Thus, excellent yields of benzothiophene are obtained by reacting styrene and hydrogen sulfide in the presence of the above-defined catalysts and range of operating conditions.

Without intending to limit the scope of the invention by any theories advanced herein to set forth more fully the nature of the invention it is to be noted that the reaction mechanism resulting in the direct attachment of the sulfur atom by single bonds to the unsaturated carbon atom in the beta position of the olefinic side chain and to the nuclear carbon atom in the ortho position with respect to the olefinic side chain may well involve one or more intermediate reactions. It is to be stressed, however, that the process of the invention is in no wise limited by the nature of particular mechanism of any intermediate reactions which may be involved in the formation of the benzothiophenes in accordance with the invention.

Although an advantage of the invention resides in the relatively long active life of the catalysts, these will nevertheless begin to lose their activity after prolonged periods of operation. Deposition of carbonaceous material upon the surface of the catalysts it is found contributes, to at least a material degree, to loss of activity. The catalyst can be restored to substantially initial activity in situ by passage of oxygen or an oxygen containing gas therethrough at a temperature in the range of, for example, from about 400° C. to about 700° C., and reactivating the thus regenerated catalyst by subjecting it to the preactivating treatment under the conditions set forth above. It has been found, however, that the period of regeneration may be materially reduced and the efficiency of the overall operation substantially increased by effecting the regeneration in the presence of steam. Thus the addition of steam to the oxygen-containing regenerating medium in sufficient amount to maintain the catalyst temperature below about 700° C. during the regeneration period enables the regeneration to be completed not only in substantially shorter period of time but obviates the need for additional preactivation of the regenerated catalyst to attain optimum conversion conditions.

The process of the invention may be executed in any suitable type of apparatus providing a reactor enabling efficient contact of reactants and catalyst. Hydrogen sulfide is separated from the reaction products and recycled to the reaction zone. Unreacted styrene hydrocarbons are separated from the reaction products by any suitable means which may comprise one or more such steps as, for example, distillation, fractionation, solvent extraction, extractive distillation, etc. Due to the selectivity of the reaction under the conditions of the invention and the substantial difference in boiling temperature of charge materials and the corresponding benzothiophenes obtained, the benzothiophenes are generally obtained in a high state of purity by simple distillation of the liquid reaction products. Unconverted styrene hydrocarbons separated from the reaction products are recycled in part or entirety to the reaction zone.

The following examples are illustrative of the production of benzothiophenes from styrene hydrocarbons in accordance with the invention:

Example I

Styrene was reacted with hydrogen sulfide by contacting a mixture of styrene and hydrogen sulfide, containing hydrogen sulfide to styrene in a molar ratio of 4:1, with a catalyst consisting of activated alumina containing about 5% of iron in the form of iron oxide, at a temperature of 600° C., atmospheric pressure and a contact time of 20 seconds. The conversion of styrene to benzothiophene amounted to 60 mole per cent of the styrene charged. On recrystallization of the solid product from ethanol a white crystalline material was separated which contained 23.4% sulfur and melted at 31.2°–31.4° C.

Example II

In a plurality of operations styrene was reacted with hydrogen sulfide in the presence of a catalyst consisting of iron supported upon adsorptive alumina (Grade B alumina). The catalyst contained about 5% of iron by weight and was preactivated by subjection to a temperature of 600° C. for a period of two hours. A mixture of hydrogen and hydrogen sulfide containing two parts of hydrogen sulfide per part of hydrogen was passed over the catalyst during the pre-activation at the rate of 100 vol./vol. catalyst/hour. The reactions were executed with a mole ratio of hydrogen sulfide to styrene of 4:1. The temperature and contact time employed, and the conversion of styrene to benzothiophene obtained in mole per cent of styrene charged in each operation, is indicated in the following table:

| Temperature, °C. | Contact time, seconds | Conversion of styrene to Benzothiophene in mole (per cent) |
|---|---|---|
| 500 | 20 | 20 |
| 500 | 40 | 43 |
| 600 | 20 | 60 |
| 625 | 20 | 63 |

With the exception of small amounts of benzene and tar-like polymer, the crude reaction product obtained in each operation consisted of benzothiophene and unreacted styrene. The yield of benzothiophene based on styrene reacted was found to be about 90% in each of the operations. The benzothiophene was recovered from the reaction products and purified by distillation. The distilled benzothiophene product had a melting point of 31° C. and on recrystallization from ethanol 31.2° C. Analysis showed it to have a sulfur content of 23.6%.

The hydrogen sulfide-free gas obtained in the operations was found to be predominantly hydrogen, with a small amount of ethylene and a saturated hydrocarbon, presumably ethane. Similarly prepared are the benzothiophene compounds indicated in column A of the following table by reacting the corresponding styrene hydrocarbon listed opposite thereto in column B, with hydrogen sulfide under the conditions of the foregoing example.

Table II

| A | B |
|---|---|
| 3-methylbenzothiophene | 2-phenyl-1-propene |
| 4-methylbenzothiophene | 1-methyl-2-ethenylbenzene |
| 2-methylbenzothiophene | 1-phenyl-1-propene |
| 4,6-diethylbenzothiophene | 2,4-diethylstyrene |
| 3,4-dimethylbenzothiophene | 1-methyl-2-isopropenylbenzene |

This application is a continuation-in-part of co-pending application Serial No. 557,048, filed October 3, 1944, now abandoned.

The claimed invention is:

1. The process for the production of benzothiophene which comprises contacting styrene in admixture with a molar excess of hydrogen sulfide with a catalyst consisting essentially of iron oxide in combination with adsorptive alumina, at a temperature of from about 575° C. to about 650° C.

2. The process for the production of benzothiophene which comprises contacting styrene in admixture with a molar excess of hydrogen sulfide with a catalyst consisting essentially of an element of the first transition series of the periodic table in combination with adsorptive alumina, at a temperature of from about 400° C. to about 750° C.

3. The process for the production of benzothiophene which comprises contacting styrene in admixture with a molar excess of hydrogen sulfide with a catalyst consisting essentially of an element of the first transition series of the periodic table in combination with an adsorptive support material, at a temperature of from about 400° C. to about 750° C.

4. The process for the production of benzothiophene which comprises contacting styrene in admixture with a molar excess of hydrogen sulfide with a catalyst consisting essentially of an element of the first transition series of the periodic table in combination with a highly porous thermally stable material at a temperature of from about 400° C. to about 750° C.

5. The process for the production of benzothiophene which comprises contacting styrene in admixture with a molar excess of hydrogen sulfide with a catalyst consisting essentially of an element of the first transition series of the periodic table, at a temperature of from about 400° C. to about 750° C.

6. The process for the production of benzothiophene which comprises contacting styrene in admixture with a molar excess of hydrogen sulfide with a dehydrogenation catalyst at a temperature of from 400° C. to about 750° C.

7. The process for the production of alkyl substituted benzothiophene which comprises contacting alkyl substituted styrene having a hydrogen atom attached to the nucleus in the ortho position with respect to the olefinic side chain in admixture with a molar excess of hydrogen sulfide with a catalyst consisting essentially of an element of the first transition series of the periodic table in combination with adsorptive alumina at a temperature of from about 400° C. to about 750° C.

8. The process for the production of alkyl substituted benzothiophene which comprises contacting alkyl substituted styrene having a hydrogen atom attached to the nucleus in the ortho position with respect to the olefinic side chain in admixture with a molar excess of hydrogen sulfide with a catalyst consisting essentially of an element of the first transition series of the periodic table in combination with an adsorptive support material, at a temperature of from about 400° C. to about 750° C.

9. The process for the production of alkyl substituted benzothiophene which comprises contacting alkyl substituted styrene having a hydrogen atom attached to the nucleus in the ortho position with respect to the olefinic side chain in admixture with a molar excess of hydrogen sulfide with a catalyst consisting essentially of an element of the first transition series of the periodic table, at a temperature of from about 400° C. to about 750° C.

10. The process for the production of alkyl substituted benzothiophene which comprises contacting alkyl substituted styrene having a hydrogen atom attached to the nucleus in the ortho position with respect to the olefinic side chain in admixture with a molar excess of hydrogen sulfide with a dehydrogenation catalyst, at a temperature of from about 400° C. to about 750° C.

11. The process for the production of benzothiophenes which comprises contacting a styrene hydrocarbon having a hydrogen atom attached to the nucleus in the ortho position with respect to the olefinic side chain in admixture with a molar excess of hydrogen sulfide with a catalyst consisting essentially of iron oxide in combination with adsorptive alumina, at a temperature of from about 575° C. to about 650° C.

12. The process for the production of benzothiophenes which comprises contacting a styrene hydrocarbon having a hydrogen atom attached to the nucleus in the ortho position with respect to the olefinic side chain in admixture with a molar excess of hydrogen sulfide with a catalyst consisting essentially of an element of the first transition series of the periodic table in combination with adsorptive alumina, at a temperature of from about 400° C. to about 750° C.

13. The process for the production of benzothiophenes which comprises contacting a styrene hydrocarbon having a hydrogen atom attached to the nucleus in the ortho position with respect to the olefinic side chain in admixture with a molar excess of hydrogen sulfide with a catalyst consisting essentially of an element of the first transition series of the periodic table, at a temperature of from about 400° C. to about 750° C.

14. The process for the production of benzothiophenes which comprises contacting a styrene hydrocarbon having a hydrogen atom attached to the nucleus in the ortho position with respect to the olefinic side chain in admixture with a molar excess of hydrogen sulfide with a dehydrogenation catalyst, at a temperature of from about 400° C. to about 750° C.

BERNARD S. GREENSFELDER.
ROBERT J. MOORE.

No references cited.